United States Patent
Lebaschi et al.

(10) Patent No.: US 8,672,224 B2
(45) Date of Patent: Mar. 18, 2014

(54) ID SCANNER WITH MACHINE-READABLE CODED INDICIA READER AND CARD IMAGING DIGITAL CAMERA

(75) Inventors: Ali Lebaschi, San Diego, CA (US); Haksoo Kim, San Diego, CA (US)

(73) Assignee: E-Seek Incorporated, San Diego, CA (US)

( * ) Notice: Subject to any disclaimer, the term of this patent is extended or adjusted under 35 U.S.C. 154(b) by 0 days.

(21) Appl. No.: 13/405,506

(22) Filed: Feb. 27, 2012

(65) Prior Publication Data

US 2013/0221101 A1   Aug. 29, 2013

Related U.S. Application Data

(63) Continuation of application No. 13/405,064, filed on Feb. 24, 2012.

(51) Int. Cl.
*G06K 7/10* (2006.01)

(52) U.S. Cl.
USPC .......................................................... 235/454

(58) Field of Classification Search
USPC ...................... 235/454, 487, 462.1
See application file for complete search history.

(56) References Cited

U.S. PATENT DOCUMENTS

| | | | |
|---|---|---|---|
| 6,802,452 B2 | 10/2004 | Lebaschi et al. | |
| 7,131,592 B2 | 11/2006 | Lebaschi et al. | |
| 7,505,928 B2 | 3/2009 | Lebaschi | |
| 8,181,872 B2 | 5/2012 | Lebaschi | |
| 2005/0040225 A1* | 2/2005 | Csulits et al. | 235/379 |
| 2005/0092844 A1* | 5/2005 | Zhang et al. | 235/487 |
| 2009/0008453 A1* | 1/2009 | Ikeda | 235/462.1 |
| 2010/0128924 A1 | 5/2010 | Rhoads | |
| 2011/0242617 A1 | 10/2011 | King et al. | |

\* cited by examiner

*Primary Examiner* — Daniel Hess
(74) *Attorney, Agent, or Firm* — Lewis Kohn & Fitzwilliam LLP; Timonthy W. Fitzwilliam

(57) ABSTRACT

An improved card scanner for imaging and decoding coded data on an inserted card is disclosed. The device features a barcode scanner, a magnetic strip reader, and a digital camera for recording an image of the surface of a card. By providing these three scanning options, the device is capable of extracting data from virtually any ID card. The device can also be used to compare text or photographs scanned from a card with the digital photograph or encoded data in a two dimensional barcode and to display both sets for comparison for added reliability. The device can also be used to verify the authenticity of virtually any ID card.

14 Claims, 5 Drawing Sheets

ID SCANNER WITH MACHINE-READABLE CODED INDICIA READER AND CARD IMAGING DIGITAL CAMERA

PRIORITY CLAIM

This patent application is a continuation of U.S. patent application Ser. No. 13/405,064 filed on Feb. 24, 2012, entitled ID Scanner with Machine-Readable Coded Indicia Reader and Card Imaging Digital Camera, and claims the benefit of the priority date thereof; accordingly the entire contents of this patent application is hereby expressly incorporated herein by reference.

BACKGROUND OF THE INVENTION

1. Field of the Invention

The disclosed device relates to card scanners with the capability of scanning multiple forms of recorded data from a surface of an ID card. In particular, the invention relates to an improved device and method for conveniently scanning, extracting, and decoding the common data recording methods typically included in modern ID cards such as barcodes, magnetic strips, or a photograph and text. More particularly, the invention pertains to a scanning device that combines the option to photograph the surface of an ID card with the ability to decipher the encoded information saved on either a magnetic strip or barcode.

2. Description of the Art

Identity-verification has become both a great benefit and serious concern in society. Computers and networks have greatly accelerated customer service, and often it is the human-controlled portions that delay a transaction. The more steps processed by a machine instead of a human, the faster, cheaper, and often more reliable, these automated and semi-automated processes can become. By allowing a computer to extract information from a reliable information source, we can minimize transactional delays and human error related to human-controlled identity gathering or identity verification.

ID card scanners and their inner workings have been disclosed in three issued U.S. patents and one published patent application. They are U.S. Pat. No. 6,802,452 issued Oct. 12, 2004, U.S. Pat. No. 7,131,592 issued Nov. 7, 2006, U.S. Pat. No. 7,505,928 issued Mar. 17, 2009, and U.S. Pub. Pat. App. No. 2009/0073503 published Mar. 19, 2009. The disclosures of the three patents and the one publication are hereby incorporated by reference.

Most adults in the United States carry ID cards as proof of identity and eligibility for certain activities. The most common government-issued ID card is a state driver's license, which typically displays one or more photographs of the card-owner and a text area that includes the owner's name, address, date of birth, gender, as well as a few basic physical identifiers such as height, weight, eye color, and hair color. State driver's licenses frequently also include the card-owner's signature. Most state-issued driver's licenses also carry that same information coded in some machine-readable form, for example a barcode (sometimes both 1-dimensional and 2-dimensional) and/or a magnetic strip. Some states also include a basic photograph of the card-owner in the machine-readable indicia.

Because these ID cards carry a large amount of information, have been verified by a reliable source such as the state Department of Motor Vehicles, are coupled with security/confidence mechanisms, and because people carry these ID cards almost everywhere, society has become dependent on ID cards as a means of identity and age verification in purchases, transportation security (at the airports and borders), and as a means to establish eligibility for age-restricted venues and purchases. While this information can be manually entered into a computer by reading the text from the front of an ID card, this information can be quickly extracted to view or archive by scanning the machine-readable coded indicia. Rather than have a person fill out an application or a cashier type in a customer's responses to a series of identification questions, that information can be rapidly communicated into a computer system by simply scanning the machine-readable indicia. The primary benefit is speed and efficiency, but by removing the human element from data entry, we can also avoid potentially costly mistakes such as misreading the card or incorrectly entering the data.

Nearly every government-issued ID card includes the card-owner's information in some form of machine-readable indicia—be that a magnetic strip or a barcode—and by enabling a system to scan either a magnetic strip or a barcode, the system will be capable of capturing information from almost any ID card. In addition to the personal information displayed on the card and coded in the machine-readable indicia, it can also be valuable to retain an image of the card front—including the card-owner's photograph—for records or security, as an alternative to asking a customer to take a photograph, for example. By quickly capturing standard customer information with a single swipe of the ID card, a business or security agent can quickly verify or record user information without unnecessarily annoying a customer or raising his or her concern during a gauntlet of personal inquiries.

The standard advance of technology is to shrink products and to accelerate processes, both with the goal of increasing convenience, also thereby decreasing the cost of a given objective. Two common bottlenecks for that process acceleration are security and reliability. People want processes to be very quick, yet still very reliable. A common way to accelerate processes while maintaining a high level of confidence in the outcome is to move as much responsibility as we can from the human to a machine. Automated recognition of items and products is a common step in accelerating many processes, ranging from the factory floor to grocery store check-out. Historically, machines cannot accurately identify and visually sort objects the same way that the human mind can, so sellers assign identification codes (the most common is the UPC or Universal Product Code) to items and mark each item with a barcode—a machine-readable version of that code.

A barcode is an optical machine-readable representation of data. The first barcodes were vertically extended version of the dots and dashes used in Morse code. Modern barcodes have evolved to represent data by varying the width of and spacing between parallel lines. This series of machine-readable parallel lines can be referred to as either a linear or 1-dimensional (1-D) barcode. Linear barcodes are easily produced and can be read with cheap sensors, but they occupy a large area for the amount of data they contain. Advances in digital recognition have enabled modern barcodes to encode more information into a 2-dimensional (2-D) array to encode more information in a smaller space. The densely packed information in 2-D barcodes can also include redundancy systems, which may accurately capture information even if the entire image is not completely captured. The most common 2-D barcode used in ID cards is the PDF417 standard, which incorporates a series of stacked barcodes. The number 417 refers to the fact that each pattern in the code consists of 4 bars and spaces, and each pattern is 17 units long. Although 2-D machine-readable symbol systems rely on a variety of non-bar marks, the term "barcode" applies to both 1-dimensional and 2-dimensional machine recognizable patterns. A barcode can be recognized by a specially designed barcode scanner or extracted from a digital image and interpreted by software in a device such as a computer or smart phone.

A popular alternative machine-readable indicia format to the barcode is the magnetic strip. Magnetic strips typically contain 2 or 3 tracks on a magnetic area implanted in a plastic medium, and are frequently used in driver's licenses, bank cards, gift cards, and membership cards. The magnetic strip contains approximately the same information as displayed on the card or registered in a barcode. The magnetic strip can be read by passing the magnetic area by a magnetic bead in a particular direction. Usually this is achieved by swiping the card in a designated slot along a vector parallel to the magnetic strip; however, this scan can also be achieved by holding a card stationary and moving the magnetic read head across the magnetic strip by way of a simple motor or solenoid. As with a barcode scanner, a magnetic strip reader can not directly "read" information from an ID card, but rather it records and then translates the data according to either some industry standard (e.g., ISO/IEC 7810 or ISO 8583) or a proprietary standard recognized by both the strip-recorder and the strip-reader.

Alternative machine-readable coded indicia formats could include radio frequency identification (RFID) or holograms. A fingerprint, vascular pattern or other biometric scanner could also be readily incorporated to increase user recognition accuracy. RFID uses radio waves to transfer data from an electronic patch or RFID tag, which typically includes an integrated circuit for storing data and modulating/demodulating a radio frequency and an antenna for receiving and transmitting the signal. RFID tags can be active (including a battery) or passive (powered by the radio waves from the RFID reader). An RFID reader, which comprises at least a power source, an integrated circuit for modulating and demodulating radio frequencies, and an antenna for transmission and reception of data, can be relatively compact, and could easily fit around the unused area required for the digital camera lens's focal length. RFID tags can be read from significantly greater distances than magnetic strips or barcodes, which sometimes have to be contact-read. Passive RFID tags may be read from up to 6 feet away by a powerful emitting RFID reader, and active RFID tags can be read from even greater distances. The integrated circuit in an RFID tag can also store significantly more data than a barcode or magnetic strip. RFID tags have become smaller, cheaper to produce, and more popular in recent years. RFID tags have made appearances in bank cards, ski resort passes, membership cards, and theme park bracelets; it would not be a challenge to incorporate an RFID tag into an ID card. Similarly it would not be a challenge to incorporate an RFID reader into an ID scanner, either in conjunction with or as a replacement to barcode scanning or magnetic strip reading, in an improved ID card scanner with digital camera.

The final objective of the current improved ID card scanner is to provide a digital camera and light array capable of capturing an image of a surface of an ID card. By either holding an ID card in front of a digital camera with autofocus or by placing an ID card in a designated scanning area, the digital camera can capture an image of the surface of the card and transmit that image to a remote computer device. Information can be extracted from the digital image, including the text data—using optical character recognition (OCR) software—or the ID card owner's portrait. Some vendors or security personnel may wish to retain an image of the ID card's owner, and extracting a portrait from a photographed ID card can be both less invasive and more convenient than requesting a customer to pose for a photograph. Additionally, the text on the surface is the only ID card data that can be read by most human eyes, and it can be comfortable to see the data in the format with which we are familiar. By photographing the card surface, a human user may intuitively know where to look for sought information. The ID card scanner can transmit either or both the photograph of the surface or the extracted data from the surface. Optical character recognition (OCR) allows a machine to read the same printed letters that humans recognize for written communication. Either a processor within the ID scanner or a remote computer device could apply an OCR process to extract the data written in text on the surface of an ID card. In addition to the front surface of an ID card, the digital camera can also capture an image of the back surface, which could allow digital extraction of barcodes or verification of further security mechanisms.

Extracting data from multiple data storage mediums (e.g. magnetic strip, 2D-barcode, and RFID tags) allows a vendor or security personnel to compare the data from the different sources. A computer device could compare the data extracted from the barcode with the data extracted from a magnetic strip and alert a user that the data did not match, potentially preventing a security threat. Another example is that a computer device or user could visually compare the extracted portrait captured by the digital camera to the digitized portrait contained in a barcode, or even display a larger image for security personnel to compare to the card-holder to verify identity. Additionally, data captured from one coded indicia reader could improve the scan of data from another coded indicia reader or could queue specific image captures from the digital camera, such as imaging a specific area to check for a state-specific security feature or capturing an image while applying a specific frequency of light to energize and illuminate an otherwise invisible hologram or security feature. Both the barcode and magnetic strip in state driver's licenses identify the issuing state, which could inform the device or user exactly where to expect specific security features, such as holograms, patterns, and color changes. The system could extract from the magnetic strip that the specific Driver License was issued by the California DMV and what year it was issued, therefore drawing a user's attention to areas where a specific security feature (e.g., the bear holograms, multicolor half dome, or blue butterfly) should exist, better preparing untrained security personnel to identify counterfeit ID cards.

Because some user systems require information extracted from the machine-readable indicia as well as an image of the card, there is a need for a system capable of reading machine-readable indicia from an ID card as well as photographing the surface of the ID card in a single, compact package. The most convenient embodiment for modern ID cards would incorporate both a barcode scanner and a magnetic strip reader alongside a digital camera. With this combination of coded indicia readers, a vendor or security personnel would be able to simply extract data from many ID cards, including any state Driver License issued in the last few years.

In light of the above, it is an object of the present invention to provide a device combining three popular machine-readable data options and related variations, and further thereby providing an all-in-one peripheral for reading information from virtually any type of ID card, increasing both security and convenience in a smaller, cheaper package.

BRIEF SUMMARY OF THE INVENTION

In a first illustrative embodiment, a card scanner includes a barcode scanner, a magnetic strip reader, and a digital camera for recording an image of the card in one package. The system also includes a data cable capable of conveying the captured information and photograph to a display or storage mechanism. In this embodiment, the device has defined card paths for the barcode scanner and for the magnetic strip reader that guide the machine-readable indicia within range of the respective reader. Additionally this embodiment includes a glass bed above a mirror that directs the image of the card to a digital camera. When an ID card is set on the flatbed, the digital camera can capture a focused image of the entire card. In this embodiment, the three capture mechanisms—camera, barcode scanner, and magnetic strip reader—are all firmly coupled and can optionally share one power source and one data communication cable.

In this embodiment, the ID card scanner operator has the option of using any or all of the three capture mechanisms. By combining these three capture mechanisms in a single device, redundant elements can be minimized, software utilization can be streamlined, expense can be greatly reduced, and the card scanner can communicate with an external computer device through a single data connection.

More particularly, the present invention, in a first aspect is an improved card scanner, comprising a first machine-readable indicia reader to capture a first machine-readable indicia on a surface of a card and a first defined card path coupled to the first machine-readable indicia reader arranged such that the first machine-readable indicia on the surface of the card comes within functional range of the first machine-readable indicia reader. Importantly, the invention further includes a processor in communication with a memory and the first machine-readable indicia reader; wherein the processor is operable to extract and decode information from the indicia capture; and a digital camera comprising a lens and a two-dimensional sensor array for acquiring at least one two-dimensional image of the surface of the card, wherein the first machine-readable indicia reader is fixedly coupled to the digital camera.

Also in this aspect, the invention can additionally be characterized wherein the first machine-readable indicia reader captures the first machine-readable indicia on the surface of a card as the card travels in one direction along the defined card path and further captures as a second indicia capture as the card travels in an opposite direction along the defined card path. Further herein, the processor is operable to electronically examine the first and the second indicia captured to determine if either the first or the second indicia capture is in either a complete state or an incomplete state; and the processor is additionally able to electronically assemble a third indicia capture in a complete state from the first indicia capture and the second indicia capture, should both first indicia capture and the second indicia capture be in the incomplete state.

Still further in the first aspect, the invention is characterized in that the first defined card path further comprises the following: a curved strut at an entry point thereto; a pressure plate longitudinally coupled to the curved strut; a recess opposite the curved strut, the recess comprising an electronic imaging component, the recess further proving an optimum functional distance between the electronic imaging component and the surface of the card; a first switch adjacent to the pressure plate wherein when the card contacts and moves along a surface of the curved strut, the curved strut acts as a cam follower and therefore causes the pressure plate to move in a lateral direction wherein subsequently the first switch is triggered by the pressure plate further providing a first actuating the electronic imaging component; and a second switch coupled to a distal end of the pressure plate and piviotably coupled thereto, the second switch acting as an arm articulating about a fixed point and the distal end that is not fixed wherein further the second switch is triggered by a downward movement of the card and provides a second actuating of the electronic imaging component. Also herein the processor is electronically coupled to the digital camera. In the preferred embodiment, the processor is capable of extracting the card owner's portrait from the two-dimensional image of a surface of the card as well as text data from the two-dimensional image of a surface of the card. Additionally the processor is capable of recognizing card-identifying data—potentially including the source of the tendered card as well as the issue date—from the indicia capture, and by comparing this card-identifying information to a database of recognized cards, the processor obtains a list of security features and electroscopic profile of cards associated with that source and issue date. The processor can compare the tendered card image capture to the expected results according to the database and determine the authenticity of a tendered card. An illumination source (e.g. light emitting diode) is further provided to illuminate the surface of a card during acquisition of the at least one two-dimensional image.

Further, in the preferred embodiment, the invention can additionally be characterized wherein the illumination source incorporates a plurality of illumination components to light the surface of the tendered card to facilitate image capture. The illumination components emit light in non-uniform frequency ranges and can be powered sequentially to facilitate an image capture during each different illumination conditions. The non-uniform frequencies could fall within the infrared (IR) spectrum, the visible light spectrum, or the ultraviolet (UV) spectrum. The image capture during infrared (IR) spectrum illumination could reveal a spectroscopic pattern based on the chemical composition of the tendered card. The image capture during ultraviolet (UV) spectrum illumination could reveal security features that are not usually visible under white light. The processor could compare this spectroscopic profile or revealed security feature to expected results obtained from the database of recognized cards and further verify the authenticity of the tendered card.

Also in the preferred embodiment, a remote computer device is coupled to the scanner via a communication link (e.g. Universal Serial Bus (USB) data port) to provide an additional storage medium or software instructions. The invention is additionally characterized wherein an single combined electrical power source providing electrical power to both the first machine-readable indicia reader and the digital camera. Still further, a second machine-readable indicia reader to capture a second machine-readable indicia on the surface of the ID card is provided, as well as a second defined card path coupled to the second machine-readable indicia reader arranged such that the second machine-readable indicia on the surface of the card comes within functional range of the second machine-readable indicia reader, and further wherein the second machine-readable indicia reader is fixedly coupled to the first machine-readable indicia reader and the digital camera. Preferred examples of first and second machine-readable indicia reader are a barcode scanner and a magnetic strip reader, respectfully. Additionally, an RFID reader could be employed to the device.

In a second aspect the invention is characterized as an improved identification card scanner comprising: a barcode scanner including an electronic imaging component to capture a barcode on a surface of a card; a first defined card path coupled to the barcode scanner arranged such that the barcode on the surface of the card comes within focal range of the electronic imaging component; a magnetic strip reader including a magnetic head to capture magnetic strips on the surface of the card; a second defined card path coupled to the magnetic strip reader arranged such that the magnetic strip on the surface of the card comes within functional range of the magnetic head; and a digital camera comprising a lens and a two-dimensional sensor array for acquiring at least one two-dimensional image of a surface of the card, and further wherein the barcode scanner, the magnetic strip reader, and the digital camera are fixedly coupled.

In still a third aspect, the invention is characterized as an improved method of scanning an ID card, comprising the following method steps: capturing data from a machine-readable indicia on a surface of a card when the machine-readable indicia travels within functional range of a machine-readable indicia reader in a defined card path; and capturing a two-dimensional image of a surface of the card using a digital camera that is fixedly coupled to the machine-readable indicia reader.

The method is additionally characterized as including the steps of: extracting text data from the two-dimensional image of a surface of the card; extracting the card owner's portrait from the two-dimensional image of a surface of the card; and extracting and verifying a known security feature from the two-dimensional image of the surface of the card; electronically capturing the data from a machine-readable indicia on the surface of a card, as a first indicia capture, as the card travels along the defined card path into the card scanner; electronically capturing the machine-readable indicia on the surface of a card as a second indicia capture as the card travels along the defined path out of the card scanner; electronically examining the first and second indicia captures to determine if the first or second indicia capture is in either a complete state or an incomplete state; and electronically assembling a third indicia capture in a complete state from the first indicia capture and the second indicia capture, should both first indicia capture and second indicia capture be in the incomplete state.

These, as well as other advantages of the present invention will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or steps limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

The present invention is described herein in the context of particular exemplary illustrative embodiments. However, it will be recognized by those of ordinary skill that modification, extensions, and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
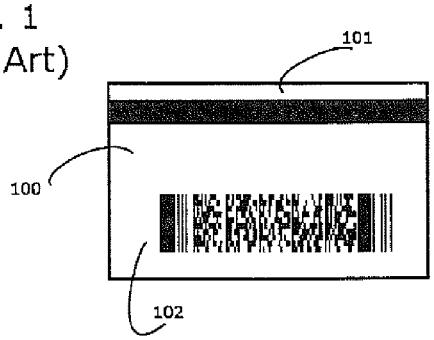
FIG. 1 shows an exemplary illustrative ID card with exemplary components.
Figure 2:
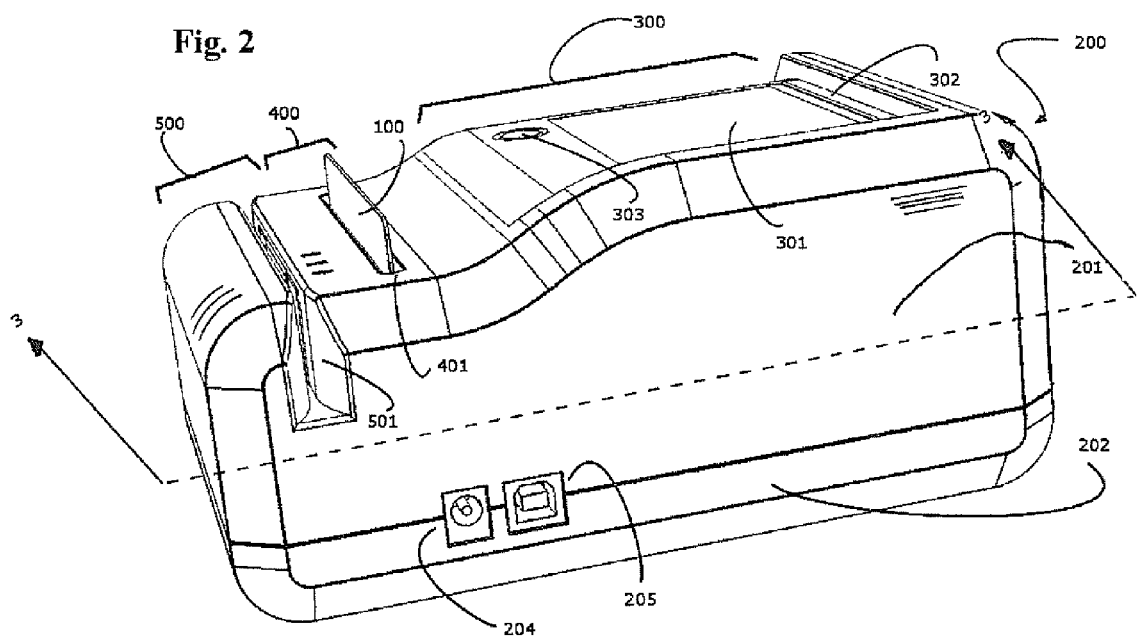
FIG. 2 is a perspective view of a preferred ID scanner of the present invention.

Initially with regard to FIG. 1 and FIG. 2, an illustrative ID card scanner 200 with machine-readable indicia reader 400, 500 and card imaging digital camera 300 is shown. The device 200 is capable of capturing and decoding information from a barcode 102 or a magnetic strip 101, in addition to capturing an image of an ID card 100. This machine-readable indicia reader could be a barcode scanner 400, a magnetic strip reader 500, or any other machine-recognizable information storage mechanism, or a combination of those devices.

In the illustrative embodiment shown in FIG. 2, the improved card scanner 200 comprises a top external case 201 and bottom external case 202 joined together and enclosing a digital camera mechanism 300, a barcode scanner 400, and a magnetic strip reader 500. An exemplary ID card 100 often includes multiple coded indicia 101,102 (in this illustrative embodiment, a magnetic strip 101 and a barcode 102) on one surface with text and a photograph (not shown) on the opposite surface.

Figure 3:
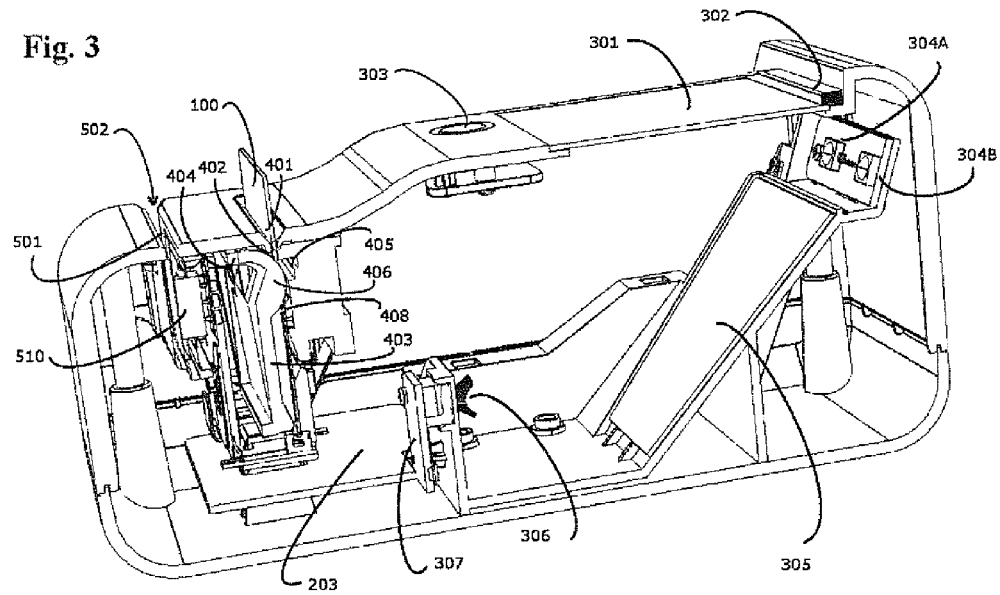
FIG. 3 is a cross-sectional view of the ID card scanner bisected along line 3-3 in FIG. 2 to reveal internal components.

FIG. 3 illustrates the internal workings of the illustrative ID card scanner 200 of FIG. 2, bisected to reveal internal components. The top external case 201 has a first slot 401 and a second slot 501 to allow an ID card 100 within detection range of a coded indicia reader (e.g. a barcode scanner 400, magnetic strip reader 500, an optical data reader, or a hologram-reader). In the illustrative exemplary embodiment of FIG. 3, a card 100 inserted through the first slot 401 accesses the barcode scanner 400 while a card 100 inserted through the second slot 501 accesses the magnetic strip reader 500. The first slot 401 is configured to innately guide a customer to insert his or her ID card 100 in an optimal alignment so that the barcode 102 on the ID card 100 will come within functional range of the barcode scanner 400 and in a proper barcode scanning direction (often vertical). The second slot 501 is configured to innately guide a customer to insert his or her ID card 100 in an optimal alignment so that the magnetic strip 101 on the ID card 100 will come within functional range of the magnetic strip reader 500 and in a proper magnetic reading direction (often horizontal). The top external case 201 also holds a transparent bed 301, through which a two-dimensional image of the surface of an ID card 100 can be captured. One corner (or edge in various embodiments) of the transparent bed has a guide-rail 302 to properly align and secure the ID card 100 during digital image capture; and further there is a button 303 somewhere on the external case 201 to initiate the digital image capture process.

The three devices (the digital camera mechanism 300, the barcode scanner 400, and the magnetic strip reader 500) are coupled to a main PC board 203, which distributes power from power supply 204 to the three devices and conveys data from the three devices to the data port 205, which can communicate with a remote computing device. The remote computing device could be a desktop or laptop computer, a tablet device, a personal digital assistant, a smart phone, a smart TV, or any number of other electronic devices. The data port 205 could be a USB port, a wireless transmitter, a serial port, or any other conventional means for electronic communication of data between a peripheral device and a remote computer device. The main PC board 203 may also contain an onboard processor and computer memory. In the presently described illustrative embodiment, the main PC board 203 has a RISC processor, onboard memory, and onboard software to allow the device to process the data from the coded indicia readers 400, 500 as well as two-dimensional images of a surface of an ID card 100, which in turn communicates the data and images to a remote computer device. However, the image capture by the digital camera 200 and the raw coded indicia captured from the coded indicia readers 400, 500 could also be transmitted prior to processing, and all processing could be handled by the remote computer device.

Figure 4:
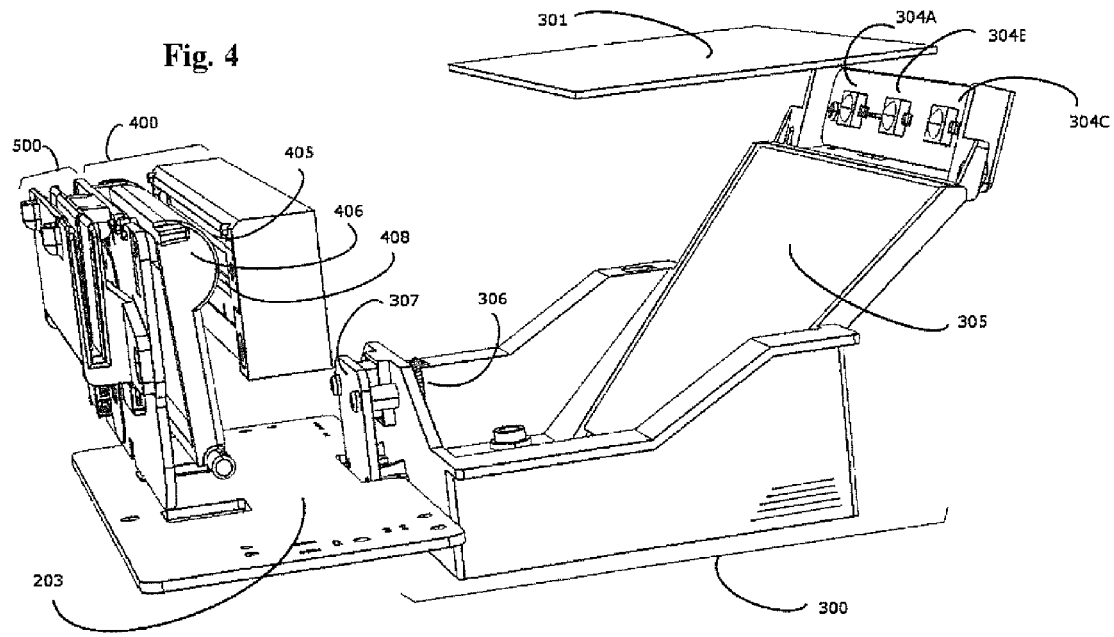
FIG. 4 shows an exemplary illustrative close-up of the internal electronic components without the external case.

FIG. 4 further shows an exemplary illustrative close-up perspective of the internal electronic components of the ID card scanner 200 depicted in FIG. 2 and FIG. 3 with the top external case 201 and the bottom external case 202 removed. Though actually connected to top external case 201, transparent bed 301 is depicted in FIG. 3 and FIG. 4 to demonstrate the location of ID card 100 during image acquisition.

Figure 5:
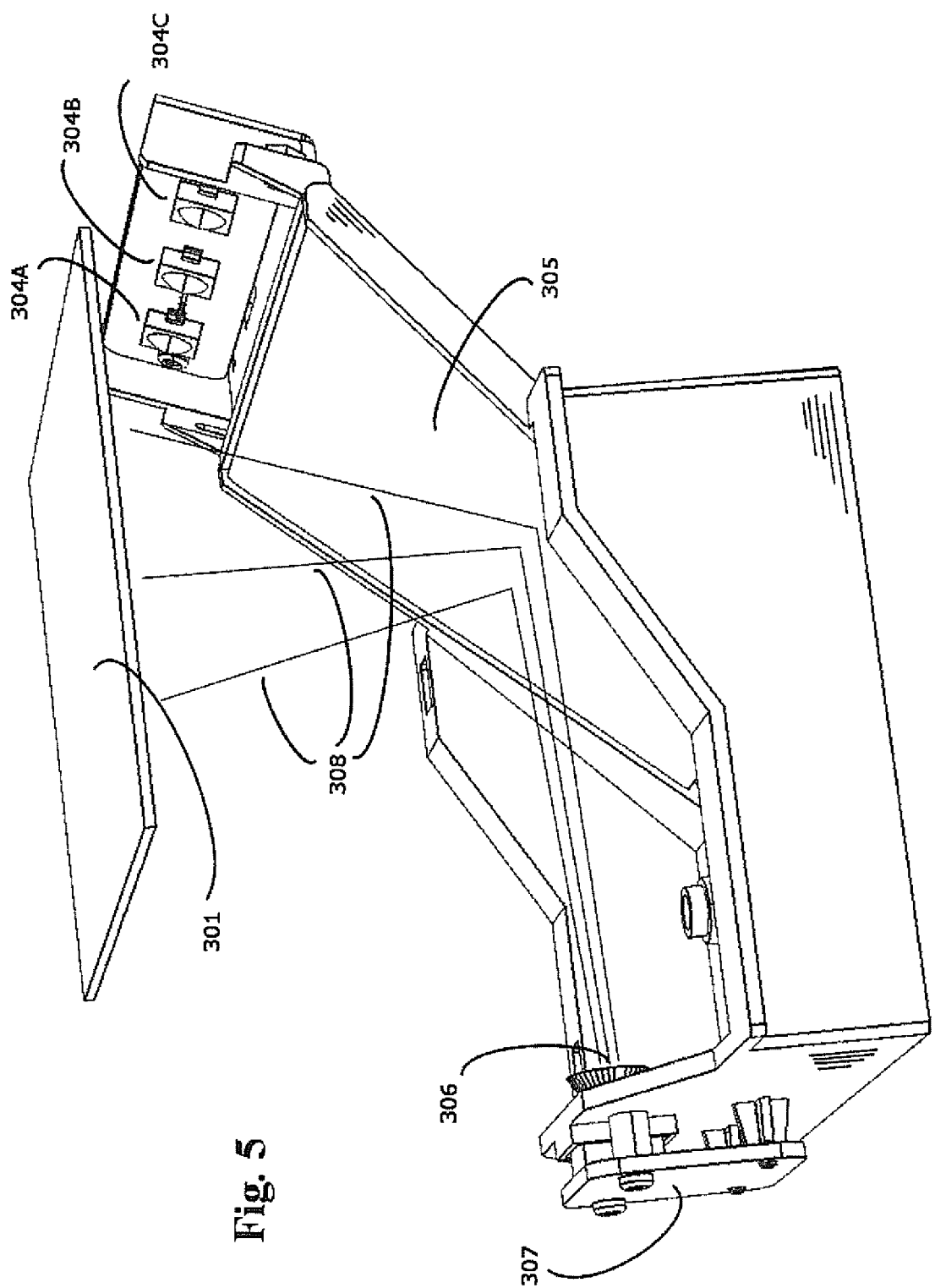
FIG. 5 shows an exemplary illustrative close-up of the digital camera and associated elements.

With regard to FIG. 5, an exemplary illustrative close-up of only the digital camera mechanism and associated elements 300 of the ID card scanner 200 is shown. The transparent bed 301 can be shaped to exactly fit a standard-sized ID card or customized to fit other, non-standard IDs. Set in the external case 201, 202 are a number of illumination sources 304A, 304B, and 304C that can light the underside of the transparent bed 301 in one or many frequencies of light. Secured to the external case 201, 202 and set at an angle to the transparent bed 301 is a mirror 305 that reflects an image of an ID card 100 placed on the transparent bed 301 to a lens 306. The image that enters lens 306 is captured as a digital image by a two-dimensional sensor array 307, one such as a charge-coupled device converting incident photons to electrical charges. The digital image can then be communicated to the main PC board 203 (FIG. 3). The mirror 305 allows a smaller package to contain the lens' minimum focal length by bending the light path, and additional mirrors can be incorporated to further reduce the overall package dimensions. FIG. 5 additionally illustrates how the path 308 of reflected image from transparent bed 301 to lens 306 can be contained in a smaller package due to mirror 305. Additional mirrors may be included to further diminish package dimensions.

In this embodiment, illumination component 304A emits infrared light (either as a single frequency or a broad range of infrared (IR) frequencies), illumination component 304B emits white light or visible light, and illumination component 304C emits ultraviolet light (either as a single frequency or a broad range of ultraviolet (UV) frequencies); however, the invention is not limited to this illumination component combination. Without departing from the spirit of the invention, in alternative embodiments illumination components 304A, 304B, and 304C could all share uniform light spectra or illumination component 304A could be red, illumination component 304B could be green, and illumination component 304C could be blue. By utilizing different frequencies from illumination components 304A, 304B, and 304C, the ID card scanner 200 can better verify authenticity of the tendered ID card 100.

Depending on the ID card 100 provided and the information desired, software and procedure could be designed to use any one or all three of the devices. A quick scan could solely swipe an ID card 100 through the magnetic strip reader 500, while a more intensive profile creation might involve the steps of swiping the ID card's magnetic strip 101 through the magnetic strip reader slot 501, inserting the ID card 100 into the barcode scanner slot, placing the ID card face down on the transparent bed 301, and depressing a button 303. By engaging all three devices 300, 400, 500, software on a remote computer device can populate a user profile with identification information, contact information, a profile portrait, cross-check the data, and confirm the existence of security measures in the course of a few seconds.

Figure 6:
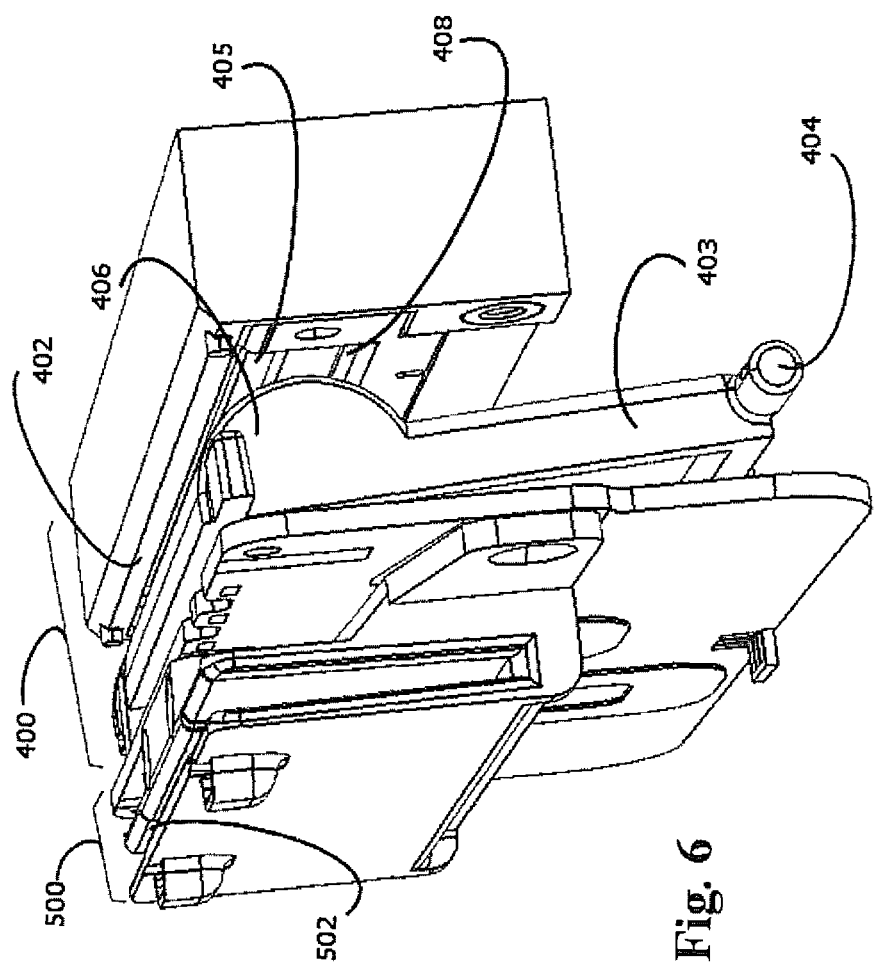
FIG. 6 shows an exemplary illustrative close-up of the barcode scanner and magnetic strip reader.

FIG. 6 illustrative a close-up of two exemplary coded indicia readers—the barcode scanner 400 and the magnetic strip reader 500. Directly beneath slot 401 (FIG. 2) is the barcode scanner's defined card path 402, which is preferably oriented to accommodate vertical card insertion. Vertical insertion is selected for the present illustrative embodiment because many conventional barcode scanners utilize a 1-dimensional sensor array and scan each row across a barcode before a computer processor sequentially stacks the scanned rows. When an ID card 100 is inserted vertically through slot 401 into defined card path 402, it encounters a pressure plate 403 which is biased by a spring 404 to hold the ID card 100 against the opposite side of defined card path 402. The side of the card path 402 against which the ID card 100 is recessed and contains an electronic imaging component 405. This electronic imaging component 405 can optionally be of the type associated with pen type readers, laser barcode scanners, CCDs (charge couple devices), or camera-based barcode reader. The bias from the pressure plate 403 maintains the ID card 100 within a narrow range of distance from the electronic imaging component 405 allowing for a narrow depth of field for focus of the electronic imaging component 405, which allows enables the electronic imaging component 405 to read the barcode 102 quicker and more accurately with a higher resolution.

Also with regard to FIG. 6, the pressure plate may have a number of curved struts 406, which apply lateral pressure to bias and stabilize the ID card 100 from lateral movement while minimizing impact on vertical movement, such as insertion and extraction. Additionally the biased pressure plate 403 with struts 406 can help to flatten an ID card 100 that might have warped during time in a pocket or wallet. The substantially curved struts 406 will also minimize the risk of binding due to friction or any device element catching on any potential embossment on the ID card 100. Still further, the curved struts 406 will act as a cam follower, converting the downward motion of the card 100 to lateral movement of the pressure plate 403 as the card moves along the strut 406 curved surface. The lateral movement will, in turn, actuate switch 407 as further detailed herein (FIG. 7A, FIG. 7B and FIG. 7C).

In addition to the barcode scanner 400 described above, FIG. 6 also includes a close-up of an exemplary illustrative close-up of the magnetic strip reader 500. Directly beneath slot 501 (FIG. 2) is the magnetic strip reader's defined card path 502. Unlike the barcode scanner's defined card path 402 (which is preferably oriented to allow vertical card movement), the magnetic strip reader's defined card path 502 preferably passes laterally across the ID card scanner 200. The lateral orientation is selected for the present illustrative embodiment because conventional magnetic strip reader heads read each vertical column as the magnetic strip 101 passes laterally across the magnetic head and then a computer processor compiles the columns by sequentially aligning them laterally. In an alternate embodiment, the ID card 100 can be held stationary in the magnetic scanner's defined card path 502 while the magnetic head 510 is mechanically translated laterally across the magnetic strip 101 via a solenoid or motor.

In an alternate embodiment, the barcode scanner 400 and the magnetic strip reader 500 occupy the same defined card path and each performs its function either simultaneously or sequentially as the ID card 100 is held in the card scanner 200.

Figure 7A:
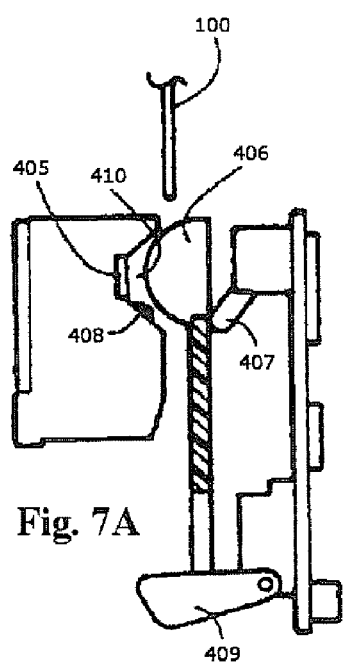
FIG. 7A, FIG. 7B, and FIG. 7C show an exemplary illustrative close-up of one possible trigger configuration in the barcode scanner.
Figure 7B:
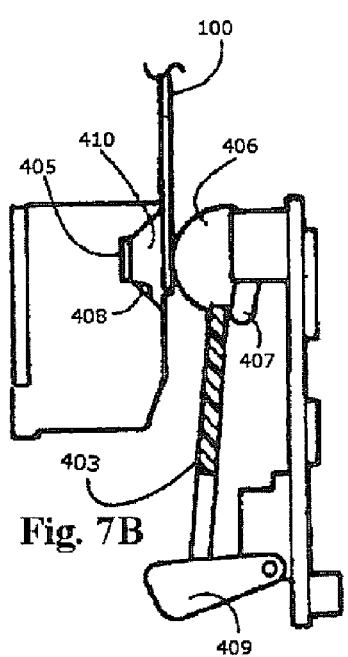
Figure 7C:
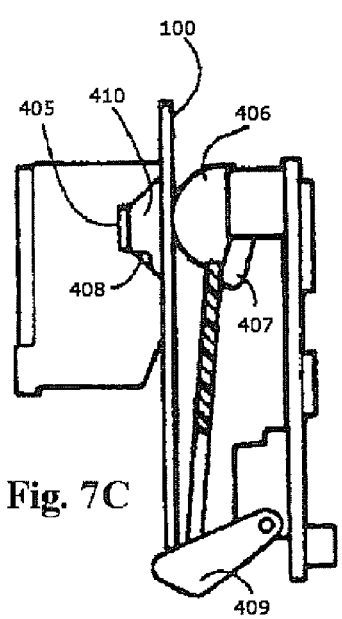

Now with reference to FIG. 7A, FIG. 7B and FIG. 7C, the electronic imaging component 405 is activated by a first micro switch 407 having a first position (FIG. 7A) when the pressure plate 403 is not in contact with an ID card 100 and a second position (FIG. 7B and FIG. 7C) when the pressure plate is in contact with an ID card 100. The electronic imaging component 405 and an illuminating component such as an LED 408 are only energized when the first micro switch 407 is in the second position, thereby reducing power consumption. There is also a second micro switch 409 which, when triggered from a rest position, indicates to the device that the ID card 100 has completed insertion into the defined card path 402. When the second micro switch 409 triggers, the electronic imaging component 405 can either de-energize or begin to capture a second scan as the ID card 100 is extracted from the defined card path 402. The first micro switch 407 and second micro switch 409 can be substituted with other means for electronic switching such as proximity sensors, motion sensors, light beams, or other means to determine entry or complete insertion in the defined card path 402.

Further with regard to FIG. 7B and FIG. 7C, as the barcode 102 passes in front of the electronic imaging component 405 during insertion into the defined card path 402, the barcode 102 is captured as a first electronic image, which can be communicated to an onboard processor and computer memory (not shown) and/or to a remote computing device through data port 205 (FIG. 2). As the barcode 102 again passes in front of the electronic imaging component 405 during extraction from the defined card path, the barcode 102 is captured as a second electronic image. Both the first and second electronic image can be communicated to an onboard processor and computer memory (not shown) and/or to a remote computing device through data port 205 (FIG. 2) or broadly referred to herein as communication link 205. The onboard processor and computer memory can determine if either the first electronic image or the second electronic image are complete captures, and then only transmit the complete captures. Hence the redundant imaging provides added reliability to the device 200. Additionally the onboard processor and computer memory can determine if neither the first nor second electronic images are complete captures, in which case the onboard processor 203 (or an external computing device) can assemble a third electronic image combined from the accurate segments of the first and second electronic images. The device could optionally include an LED (not shown) or speaker to indicate to the user when a usable, complete electronic image of the barcode has been successfully obtained. In an alternate embodiment, the ID card 100 could be held stationary in the barcode scanner's defined card path 402 as the electronic imaging component 405 is mechanically translated vertically across the barcode 102 via a solenoid or motor.

FIG. 7A and FIG. 7B show an exemplary illustrative close-up of the first and second micro switches 407 and 409 in the magnetic strip reader. In this exemplary embodiment, the electronic imaging component 405 and LED 408 are set in a recess 410. FIG. 7A shows the curved struts 406 that extend from pressure plate 403 resting slightly inside of recess 410 when no ID card 100 is inserted. FIG. 7B shows that as ID card 100 is inserted into defined card path 402, the ID card 100 pushes back on the curved struts 406, which in turn trips the first micro switch 407 and energizes the electronic imaging component 405 and the LED 408 to capture barcode 101 off of inserted ID card 100. In FIG. 7C, ID card 100 reaches the bottom of defined card path 402, it triggers second micro switch 409, either de-energizing electronic imaging component 405 and LED 408 or initiating a second pass scan as ID card 100 is extracted.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular ID Card Scanner with Machine-Readable Coded Indicia Reader And Card Imaging Digital Camera as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. An improved card scanner, comprising:
   a first machine-readable indicia reader to capture a machine-readable indicia on a side surface of a tendered card;
   a first defined card path coupled to said machine-readable indicia reader arranged such that said machine-readable indicia on said surface of said card comes within functional range of said machine-readable indicia reader, wherein said first defined card path provides for vertical movement for said card;
   a second defined card path coupled to a second machine-readable indicia reader, wherein said define card path provides lateral movement of said card perpendicular with respect to said first defined path;
   a processor in communication with a memory and said first and second machine-readable indicia reader, wherein said processor is operable to extract and decode information from said indicia capture;

a digital camera comprising a lens and a two-dimensional sensor array for acquiring at least one two-dimensional image of a side surface of said card; and a plurality of illumination components to illuminate said side surface of a card during acquisition of said at least one two-dimensional image.

2. The improved card scanner of claim 1, wherein said plurality of illumination components includes a white illumination component and at least one non-white illumination component.

3. The improved card scanner of claim 2, wherein said at least one non-white illumination components includes a plurality of specific frequency illumination components of non-uniform frequency.

4. The improved card scanner of claim 3, wherein said non-uniform light frequencies include ultraviolet (UV) and infrared (IR) frequencies.

5. The improved card scanner of claim 2, wherein said plurality of illumination components are sequentially powered.

6. The improved card scanner of claim 5, wherein at least one two-dimensional image is captured during each of said plurality of illumination component sequential illumination periods.

7. The improved card scanner of claim 2, wherein said extracted and decoded information from said indicia capture includes card-identifying data including a source and an issue date of said tendered card, and wherein said processor is further in communication with said digital camera and is further operable to compare information extracted from said indicia capture with a database of recognized card features.

8. The improved card scanner of claim 7, wherein said processor is further operable to identify an expected security feature from said database, to selectively power illumination components to emphasize said expected security feature not usually visible under white light, and to compare the captured images to expected results.

9. The improved card scanner of claim 8, wherein said at least one illumination component that is selectively powered emits light in an ultraviolet (UV) frequency range.

10. The improved card scanner of claim 7, wherein said processor is further operable to identify an expected spectroscopy profile from said database, to selectively power at least one illumination component, to capture a tendered spectroscopy profile, and to compare said tendered spectroscopy profile to said expected spectroscopy profile.

11. The improved card scanner of claim 10, wherein said at least one illumination component that is selectively powered emits light in an infrared (IR) frequency range.

12. The improved card scanner of claim 1, wherein said first machine-readable indicia reader is a barcode scanner and said first machine-readable indicia is a barcode.

13. An improved card scanner, comprising:

a digital camera comprising a lens and a two-dimensional sensor array for acquiring at least one two-dimensional image of a side surface of a card;

a processor in communication with a memory and a first machine-readable indicia reader, wherein said processor is operable to extract and decode information from said at least one two-dimensional image; and a plurality of illumination components to illuminate said surface of a card during acquisition of said at least one two-dimensional image, wherein said plurality of illumination components are sequentially powered, wherein at least one two-dimensional image is captured during each of said plurality of illumination component sequential illumination periods, wherein said processor is further operable to identify an expected spectroscopy profile from a database in communication with the processor, to capture a tendered spectroscopy profile, and to compare said tendered spectroscopy profile to said expected spectroscopy profile.

14. The improved card scanner of claim 13, wherein said plurality of illumination components includes a white illumination component and at least one non-white illumination component, wherein said at least one non-white illumination components includes a plurality of specific frequency illumination components of non-uniform frequency, wherein said non-uniform light frequencies include ultraviolet (UV) and infrared (IR) frequencies.

\* \* \* \* \*

UNITED STATES PATENT AND TRADEMARK OFFICE
CERTIFICATE OF CORRECTION

PATENT NO. : 8,672,224 B2  Page 1 of 1
APPLICATION NO. : 13/405506
DATED : March 18, 2014
INVENTOR(S) : Ali Lebaschi et al.

It is certified that error appears in the above-identified patent and that said Letters Patent is hereby corrected as shown below:

In the Specification:

Column 1, line 30: delete the "-" between the words "Identity" and "verification";

Column 2, line 41: replace the word "cheek" with the word "check";

Column 5, line 58: replace the word "proving" with the word "providing";

Column 5, line 66: insert the word --of-- between the word "actuating" and "the";

Column 6, line 30: replace the word "conditions" with the word "condition";

Column 6, line 45: replace the word "an" with the word "a";

Column 6, line 46: replace the word "providing" with the word "provides";

Column 10, line 21: replace the word "illustrative" with the word "illustrates";

Column 10, line 34: insert the word --passes-- after the number "100";

Column 10, line 42: delete the word "allows";

In the Claims:

Column 12, Claim 1, line 61: replace the word "define" with the word "defined".

Signed and Sealed this
Twenty-seventh Day of May, 2014

Michelle K. Lee
*Deputy Director of the United States Patent and Trademark Office*